United States Patent [19]

Nerone

[11] Patent Number: 4,587,604
[45] Date of Patent: May 6, 1986

[54] POWER SUPPLY EMPLOYING LOW POWER AND HIGH POWER SERIES RESONANT CONVERTERS

[75] Inventor: Louis R. Nerone, Cleveland, Ohio

[73] Assignee: Reliance Electric Company, Cleveland, Ohio

[21] Appl. No.: 698,924

[22] Filed: Feb. 6, 1985

[51] Int. Cl.$^4$ ............................................ H02M 3/335
[52] U.S. Cl. ......................................... 363/17; 363/28;
363/65; 363/71; 323/271; 307/82; 307/87
[58] Field of Search ...................... 363/17, 28, 65, 71;
323/268, 271; 307/43, 44, 45, 66, 82, 87;
179/70, 77, 18 HB, 51 AA, 17 E

[56] References Cited

U.S. PATENT DOCUMENTS 4,502,152 2/1985 Sinclair ............................ 323/268 X

FOREIGN PATENT DOCUMENTS 5959075 9/1982 Japan ..................................... 363/71

OTHER PUBLICATIONS

D. Azzis and J. L. Baret, "Parallel Identical Direct-Mode DC-DC Converters", Jul. 1982, *IBM Technical Disclosure Bulletin*, vol. 25 pp. 624-625.

R. H. Baker, "High Frequency Power Conversion with FET-Controlled Resonant Charge Transfer", Apr. 1983, *PCI Proceedings*, pp. 130-133.

*Primary Examiner*—Patrick R. Salce
*Assistant Examiner*—Emanuel Todd Voeltz
*Attorney, Agent, or Firm*—Robert B. Sundheim; Michael M. Rickin

[57] ABSTRACT

A power supply is provided for supplying regulated power to an output from an unregulated DC voltage source. The supply includes low and high power series resonant converters, each including a pair of power switches which are alternately turned on and off for completing a series resonant circuit with the source and with a primary winding of a transformer coupled to the output. A switch control responds to loading of the output and drives the switches on and off at an operating frequency that varies with the loading. A converter control monitors the operating frequency and controls operation of the converters such that one or both converters operate in dependence upon loading to avoid operation within a particular frequency range.

8 Claims, 12 Drawing Figures

POWER SUPPLY EMPLOYING LOW POWER AND HIGH POWER SERIES RESONANT CONVERTERS

BACKGROUND OF THE INVENTION

This invention relates to the art of power supplies and, more particularly, to controlling the operation of low power and high power series resonant converters of the switching regulator type.

Power converters are known in the art and typically serve to accept energy from an unregulated energy source, such as a voltage source, and derive therefrom a regulated voltage which is applied to a load circuit. The regulation function is performed by interposing a regulating device between the source of energy and the load circuit. It is known in the prior art to utilize a regulating device, such as a controlled variable impedance interposed between the source and the load. In such case, the variable impedance is continuously varied in its impedance magnitude in order to maintain a constant voltage or current at the load circuit. Such variable impedances dissipate significant amounts of the power transmitted from the source to the load.

Another form of regulating device known in the prior art includes switching type regulating devices interposed between the source of energy and the load. These operate in a discontinuous manner in controlling the rate of energy transmission and, hence, consume less power during the regulating operation than do the variable impedance type regulating devices. The switching device has two modes of operation, fully on and fully off. The switching device is periodically turned on for a time interval to permit energy transfer for purposes of maintaining the power output at a predetermined level.

Typically, such switching type regulating devices employed in power converters utilize semiconductor devices, such as power transistors, as the switching devices. These devices are turned fully on, or saturated, or fully off during operation. When fully on, the semiconductor devices are conducting and little or no power is dissipated. Also, when nonconducting or fully off no power is dissipated therein. Power is, however, dissipated in such a semiconductor device during the time interval of switching from a nonconducting condition to a conducting condition and visa versa. It is during the switching time interval that a substantial amount of power may be dissipated in such a a semiconductor device, and if large enough this may severely damage the semiconductor device.

Power converters employing switching type regulators utilizing semiconductor devices as power switchers have typically been operated such that the power switches supply a squarewave signal to a power transformer which couples the power converter to a load. The squarewave operation requires that the power switches dissipate energy whenever voltage and current are interrupted. Consequently, there is a switching loss which is directly related to the operating frequency of the power switches. This has contributed to limiting such power switches to low power applications during high frequency operation. Otherwise, they are operated at a low frequency using larger components and more space.

It is desirable to provide power converters which are cost effective and which occupy a small amount of space. This, then, necessitates high frequency operation, such as in excess of 20 KHz and preferably at substantially higher frequencies, such as 200 KHz, while transferring large amounts of power, such as on the order of 1500 watts or more. In order to achieve such high frequency operation of power switches, it has been proposed to employ sinusoidal operation as opposed to the squarewave operation typically employed in the prior art. Such a proposal is found in the article "High Frequency Power Conversion With FET-Controlled Resonant Charge Transfer", by R. H. Baker, published in the PCI April, 1983 proceedings, pages 130-133. This articles proposes an operation wherein sinusoidal current pulses flow through a series resonant circuit including the primary winding of a power transformer by way of a power switch. Each sinusoidal current pulse terminates to a zero level before the voltage forcing function is withdrawn. As a consequence, the power switches turn on and off at zero current to thereby provide lower component switching loss to reduce component stress.

As reported in Baker, supra, alternate sinusoidal current pulses flow through a series resonant tank circuit. During one half cycle a current pulse flows in a first direction through the primary winding by way of a first power switch and a first capacitor. During the next half cycle a current pulse flows in the opposite direction through the transformer primary winding by way of a second power switch and a second capacitor. These two power switches are each turned on for a fixed time duration with the on times being separated by a minimum fixed interval or dead time during which one switch is turned off and the other is turned on.

The power switches in Baker, supra, are turned on and off at a frequency which varies from a low frequency, for low loading or low power operations, to a high frequency, for high loading or high power operations. At high power operations such a converter operates near its maximum resonant frequency. If the power requirements drop, the operating frequency will drop. Depending upon the application for which such a converter is employed, this variable operating frequency may present problems. If the converter is employed as a high power converter, such as 1500 watts at an operating frequency of 200 KHz, a drop in the loading may result in an objectional operating frequency. For example, if such a converter supplies power to telephone lines, a drop in loading may cause the operating frequency to fall within the telephone voice band, namely, within a frequency range on the order of 300 Hz to 3400 Hz. The ripple voltage supplied to the telephone lines may, during this operating frequency range, inject objectional audible noise onto the telephone lines.

SUMMARY OF THE INVENTION

It is an object of the present invention to provide a power supply employing series resonant converter means having variable operating frequency, depending on loading, and which may be operated at various power levels while avoiding operation during objectionable frequency ranges.

It is a still further object of the invention to provide operation of such converter means so as to minimize injecting objectional noise onto the output circuit thereof.

The foregoing and other objects are obtained by the invention herein. In accordance with the invention, a power supply is provided for supplying regulated power to an output circuit from an unregulated DC voltage source. The supply includes low and high power series resonant converters, each including a pair of power switches which are alternately turned on and off for completing a series resonant circuit with the source and with a primary winding of a transformer coupled to the output circuit such that current pulses alternately flow in opposite directions through the primary winding. A switch control responds to loading of the output circuit and drives the switches in each converter on and off at an operating frequency which varies with loading. A converter control monitors the operating frequency and controls operation of the converters such that one or both converters operate in dependence upon loading to avoid operation within a particular frequency range.

DESCRIPTION OF THE DRAWINGS

The foregoing and other objects and advantages of the invention will become more readily apparent from the following description of the preferred embodiment of the invention when taken in conjunction with the accompanying drawings which are a part hereof and wherein.

DESCRIPTION OF THE PREFERRED EMBODIMENT

Figure 1:
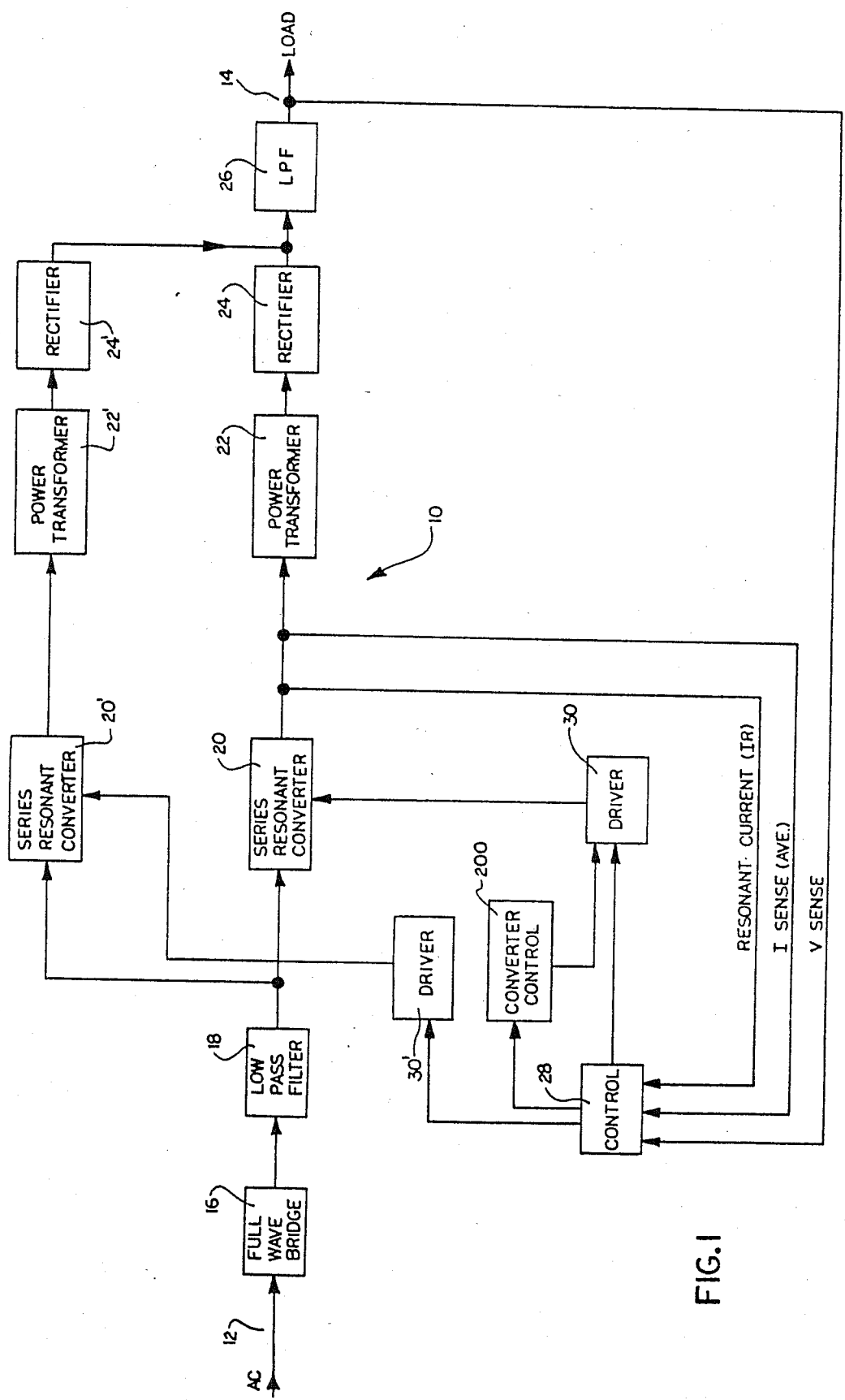
FIG. 1 is a block diagram illustration of one application of the invention in a power supply.

Reference is now made to the drawings wherein the showings are for purposes of illustrating a preferred embodiment only. Referring now to FIG. 1, there is shown a block diagram of a high frequency power supply 10 which converts an AC voltage at its input 12 to a regulated DC voltage at its output 14. This is achieved by first rectifying the AC voltage by means of a full wave bridge rectifier 16 and this rectified voltage is then filtered by a low-pass filter (LPF) 18 providing at the output of the filter an unregulated DC voltage.

Supply 10 includes a series resonant power converter 20 which receives the unregulated DC voltage from the low-pass filter 18 and provides the regulated DC voltage at output terminal 14. As will be discussed in greater detail hereinafter, the converter 20 includes a pair of power switches, preferably field effect transistors (FETS), which are arranged in a series half bridge configuration. These are alternately turned fully on and fully off through the use of a pulse position modulation (PPM) technique. In this technique, for stable input and output conditions pulses of constant width are applied to the gate electrodes of the FETS to turn them on for a fixed duration. It is the frequency at which these pulses are applied to the FETS that determines the transfer of power. The series resonant converter includes the primary winding of the power transformer 22 and the secondary winding is coupled to the load 14 by means of a rectifier 24 and a low-pass filter 26.

The switching of the FETS and therefore the operation of supply 10 is generally controlled as a function of either the voltage present at the output terminal 14 or the average current flowing in the primary winding of the power transformer 22. Ordinarily, the supply 10 operates in a voltage controlled mode to provide regulated DC voltage at output 14. As the load varies, the switching of the FETS is controlled to maintain the regulated output.

In addition to regulation based on loading, control 28 also responds to the average current flowing in the series resonant circuit. Consequently, the rate at which current pulses are applied through the power switches and, hence, the series resonant converter circuit is controlled to limit the magnitude of the average current and thereby prevent damage to sensitive power components such as FETs and rectifiers.

Additionally, as will be brought out in detail herein, the current pulses flowing through the series resonant converter 20 are supplied at a frequency dependent upon the magnitude of the series resonant current flowing therethrough. It is these three inputs, output voltage, average current and resonant current that are supplied to the control 28 which, in turn, operates a driver circuit 30 to control the switching of the FETS in the series resonant converter.

A low power series resonant converter 20' and associated power transformer 22' and rectifier 24' are connected in parallel with converter 20, transformer 22 and recitfier 24. This low power converter 20' operates in parallel with the higher power converter 20 during high power operations. For low power operations a converter control 200 operates to disable the high power converter driver 30 so that only the low power converter 20' supplies power to the load.

Figure 2:
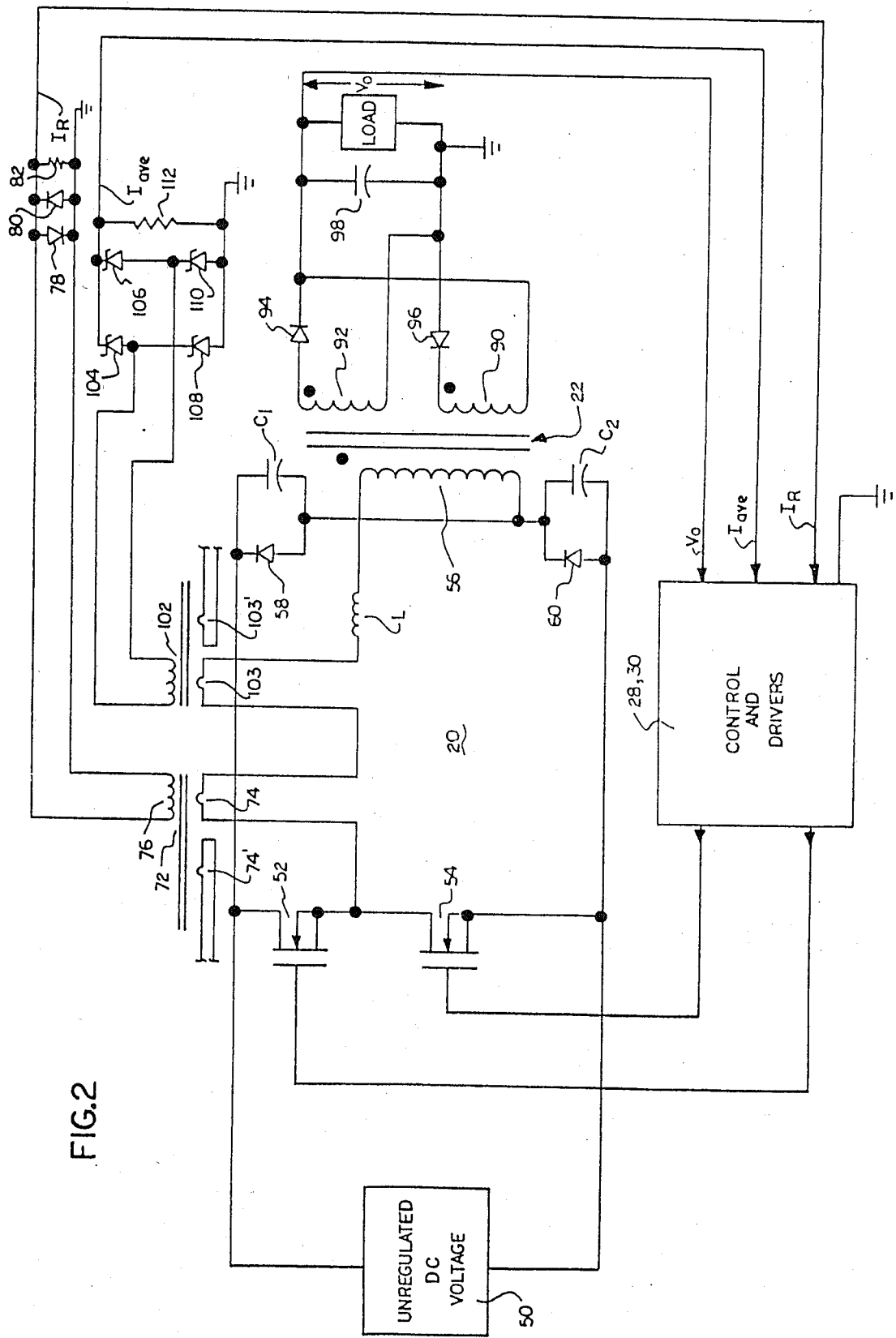
FIG. 2 is a schematic-block diagram illustration of the resonant converter and control therefor.

Having briefly described the operation of a power supply in conjunction with FIG. 1, attention is now directed to FIG. 2, which illustrates the series resonant converter 20 and the power transformer 22 in somewhat greater detail. The description that follows applies equally to the low power converter 20' and its associated transformer 22' and recitfier 24'. The input to the converter is shown in FIG. 2 as being an unregulated DC voltage 50 which is representative of the output of the low-pass filter 18 in FIG. 1. The converter includes a pair of field effect transistors 52 and 54 which are alternately gated into conduction, or fully on, by the converter control 28. Whenever one of the field effect transistors is turned on, it completes a path for current to flow from the voltage source 50 through a series resonant circuit including the primary winding 56 of power transformer 22 and a series inductor L together with one of two capacitors $C_1$ and $C_2$. Diodes 58 and 60 connected in parallel with capacitors $C_1$ and $C_2$, respectively, constrain the voltage excursions across these capacitors, thereby stabilizing the resonant tank circuit. The inductor L may be present in fact or it may represent the leakage reactance of the transformer.

In operation, as control 28 turns on one of the FETS 52 and 54, a current pulse flows through the resonant circuit. Each pulse has a rise time and fall time dependent on the components in the resonant tank circuit and appears in the form of a sinusoidal pulse. At steady state conditions, these pulses will be uniformly sinusoidal in shape and have a fixed width and a fixed peak value. The current pulses $I_R$ flowing through the series resonant circuit are represented, for example, in FIGS. 3A and 3B. At low power, or low loading conditions, the current pulses occur at a low frequency of operation of the FETS 52 and 54. As demand increases for higher power operation, these pulses occur at a greater frequency as is shown in FIG. 3B. To achieve operation without the FETS 52 and 54 being on at the same time, then the frequency of supplying the current pulses must be held to be somewhat less than that of a maximum resonant frequency $F_M$ which is determined by the components of the resonant tank circuit. Consequently, a dead time D between sinusoidal pulses may be substantial at low power requirements, but quite short during high power requirements.

In Baker, supra, a minimum switch off or dead time is set to a value of two microseconds. Each power switch has a fixed on duration of four microseconds. At maximum power, then, the total off time is four microseconds out of a cycle length of twelve microseconds. This limits Baker's maximum operating frequency to a value substantially less than his maximum resonant frequency $F_M$. The higher the operating frequency, the greater the amount of power which may be transferred. Baker's fixed minimum dead time limits the power transfer characteristics.

The switching on (or off) of such power switches can be accomplished during periods of no current flowing in the resonant circuit in less time than setting such an arbitrary dead time interval. Instead, a determination can be made as to whether current is acutally flowing in the resonant circuit and, if it is not, then one power switch can be turned off and the other turned on without dissipating power across a power switch. This is achieved by the control circuitry to be described herein.

During some loading conditions, such as a short circuit of the output, the trailing edge of a current pulse may exceed the arbitrary minimum dead time interval proposed by Baker, supra, as is indicated by the trailing edge shown by dotted lines 70 in FIG. 3B. If the power switches are now actuated, one turned off and the other turned on, substantial current will still be flowing through the resonant circuit. Energy will be dissipated at the power switches, which may result in component failure. Circuitry is provided in the control 28 to ensure that the resonant current flow is at essentially a zero level before enabling switch turn on (or turn off).

The resonant current $I_R$ flowing in the resonant circuit is sensed with a current sensing transformer 72 having a single turn primary winding 74 connected in the series resonant circuit and a multiple turn (such as 60 turns) secondary winding 76 connected to a wave shaping circuit. The wave shaping circuit includes a pair of oppositely poled clipping diodes 78 and 80 so as to develop a voltage across a resistor 82 representative of a processed or peak clipped current. The waveform would appear as in FIG. 3A or 3B, but with the peaks clipped off. This voltage is representative of the resonant current $I_R$ and is supplied as one input to the control 28.

In addition to sensing and processing the resonant current for use in controlling the switching of power switches 52 and 54, the controller 28 also senses the average current $I_{AVE}$, as well as the output voltage $V_0$ for use in controlling the frequency of operation of the power switches. The output voltage $V_0$ is taken across the load which is on the secondary side of the power transformer 22. This power transformer 22 has secondary recitfication taken from a pair of secondary windings 90 and 92, poled as shown, and interconnected with diodes 94 and 96 to maintain a constant charge across a capacitor 98 for supplying the load. The output voltage is taken across the load and is supplied to the control 28. As the load requirements increase because of a loading effect, the frequency of the current pulses in the resonant circuit will be increased.

Control 28 also monitors the average current flowing in the resonant circuit. If the average current is considered too high for proper usage of the FETS, then the frequency of supplying current pulses through the resonant circuit will be descreased to prevent destruction of the FETS. The average current may be sensed as with a current transformer 102 having a single turn primary winding in series with the resonant circuit and its secondary winding, on the order of 60 turns, connected to a full wave bridge rectifier made up of Schottky diodes 104, 106, 108 and 110. The full wave rectified current may take the form as shown by the pulsating waveform in FIG. 3C. A voltage representative of the average current $I_{ave}$ may be developed across an output resistor 112. This voltage is supplied to the control 28.

Figure 4:
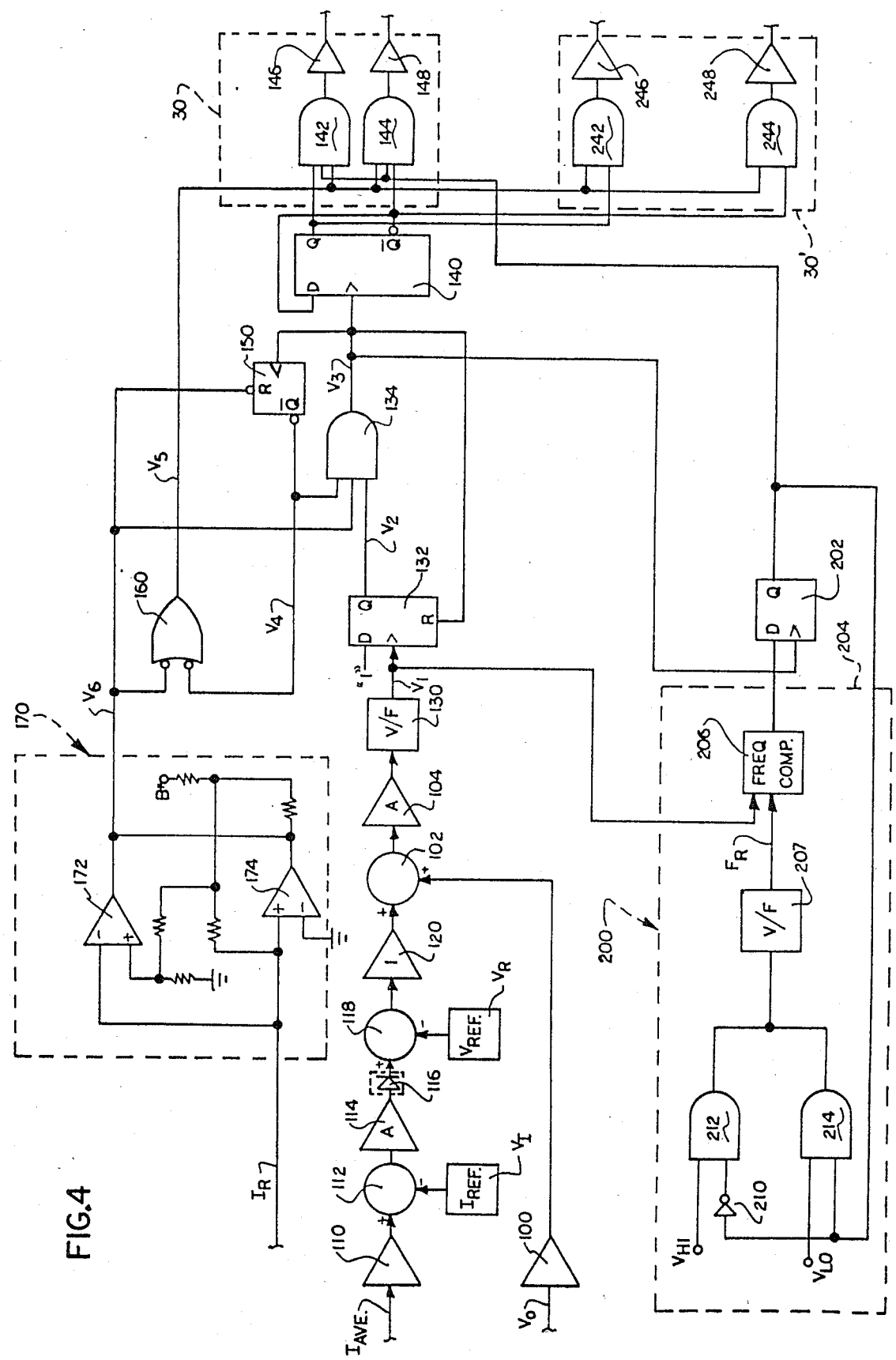
FIG. 4 is a schematic-block diagram illustration of a control for a series resonant converter illustrating one embodiment of the invention herein; and, FIGS. 5A-5F are waveforms of voltages useful in describing the operation of the control in FIG. 4.

Reference is now made to FIG. 4 which illustrates the control 28 and the driver circuit 30 in greater detail. The sensed output voltage $V_0$ is received by control 28 and is amplified by an amplifier 100, which may suitably take the form of an operational amplifier, with the amplified output then being supplied as a positive input to a summing node 102. Here, the output voltage $V_0$ is effectively compared with a reference voltage $V_R$ to develop an error signal $V_E$, after being amplified by an amplifier 104 having a gain of A. The error signal $V_E$ is used to control the frequency at which current pulses are supplied to the series resonant circuit. This error signal is a DC voltage which may vary in magnitude from a negative value to a positive value. At its maximum positive value, it indicates that the output voltage $V_0$ is too high and should be reduced. In such case, the frequency of supplying current pulses is reduced. As the error signal $V_E$ becomes less positive or more negative, it indicates loading has taken place and that more power should be transferred and, hence, the frequency of supplying current pulses to the resonant circuit should be increased.

The error signal $V_E$ may be modified if the sensing circuit determines that the average current $I_{ave}$ flowing through the resonant circuit is too high. In such a case, the frequency of supplying current pulses to the resonant circuit should be reduced to lower the value of the average current. For this reason, the average current is compared against a reference, and if it exceeds the reference, then the frequency of supplying pulses to the resonant circuit will be descreased by increasing the magnitude of the error signal $V_E$ in a positive direction. Otherwise, no change is made to the magnitude of the error signal.

The sensed signal represenative of the average current $I_{ave}$ is actually a voltage signal representative of this current. This voltage signal is amplified by a DC amplifier 110, which may take the form of a suitable operational amplifier, and is then supplied as a positive input to a summing circuit 112. Here, the voltage representative of the average current is compared with a voltage $V_I$ representative of a current reference and the difference in voltage levels is amplified by a suitable amplifier 114. If the amplified difference voltage is positive, then, this is indicative that the average current exceeds the reference current. This positive voltage will be passed by a diode 116 as a positive input to a summing circuit 118 which receives the voltage reference $V_R$ as a negative input. The summed signal is amplified by an amplifier 120, having a gain of 1, and is supplied as a positive input to the summing node 102. If the average current is greater than the reference current, then the effect of this is to increase in a positive direction the error signal $V_E$ so as to lower the frequency of supplying current pulses to the resonant circuit. If the average current is less than the reference current, then no voltage will be passed by diode 116 and no change will be made to the error signal $V_E$.

The error signal $V_E$ is converted by a voltage-to-frequency converter 130 so as to produce a squarewave pulse train having a frequency which varies inversely with that of the error voltage. As discussed previously, the transfer characteristics are such that when the error signal $V_E$ is positive at its maximum value, the frequency of the pulses from converter 130 decrease to produce low power operation. However, as the error signal becomes less positive or more negative, then the frequency of the pulses from converter 130 increase to provide for higher power operation. This may be envisioned with reference to the waveform in FIG. 5A which shows, during low power operation, the frequency of the squarewave output voltage $V_1$ from converter 130 is low and then increases in frequency for one-half power and full power operations.

The voltage-to-frequency converter 130 may take the form of a typical voltage controlled oscillator and when the output voltage $V_1$ goes positive, as shown in FIG. 5A, it is supplied to the clock input of a D-type flip-flop 132 having its D input tied to a positive or binary 1 voltage level. Consequently, when converter voltage $V_1$ goes high, this causes the Q output voltage $V_2$ to go high, as is indicated in the waveform of FIG. 5B. This positive voltage $V_2$ is supplied as one input to an AND gate 134. This is a three input AND gate and at this stage in the operation, the other two inputs are enabled by positive voltage signals, and consequently, after a slight propagation time, the output voltage $V_3$ of AND gate 134 will go high, as indicated by the waveform of voltage $V_3$ in FIG. 5C.

Each time the output voltage $V_3$ of AND gate 134 goes high, it clocks a D-type flip-flop 140 in the driver control 30. This flip-flop has its Q output inverted and fed back to the D input thereof so that the flip-flop acts as a divide-by-two counter. Consequently, as positive going pulses are supplied to the clock input, the Q and $\overline{Q}$ outputs alternately provide high or binary 1 signals to AND gates 142 and 144. These gates are enabled so long as voltage $V_5$ is high. The AND gates alternately supply gate driver pulses by way of amplifier buffers 146 and 148 to alternately turn on the power switches 52 and 54 in the resonant converter. The time duration that each power switch is turned on is dependent upon the time duration that the voltage $V_5$ is high. This is discussed in detail hereinafter.

The output voltage $V_4$ of a one-shot circuit 150 is normally high so as to provide an enabling input to the AND gate 134. Similarly, voltage $V_6$ is normally high providing a second enabling input to the AND gate 134. Consequently, AND gate 134 is normally conditioned for voltage $V_2$ to become high and then its output voltage goes high to clock the flip-flop 140, as discussed above. When output voltage $V_3$ goes high, it also actuates the one-shot circuit 150 causing its output voltage $V_4$ to go low, as seen in the waveform of FIG. 5D, and thereby remove the enabling input to AND gate 134. After a slight propagation time, the output voltage $V_3$ returns to its normal low level, as is seen in FIG. 5C. The one-shot circuit 150 produces a low level pulse of a fixed time duration unless the one-shot circuit is reset earlier by voltage $V_6$ going low. The output voltage $V_4$ of the one-shot circuit is applied to one input of a NAND gate 160. If either input to gate 160 goes negative, then the output voltage $V_5$ of this gate, after a short propagation time, will go high, as is seen in FIG. 5E. When voltage $V_5$ goes high it is passed by one of the AND gates 142 and 144 to turn on one of the power switches. If the second input voltage $V_6$ to gate 160 remains high, the drive enable signal $V_5$ will go low to turn off the power switch once the one-shot circuit 150 has timed out. The one-shot period is selected to be slightly greater than the resonant period, determined by the tank circuit. This will permit operation even if the resonant current detector circuit fails.

Control of the switching frequency of the power switches 52 and 54 is also determined by sensing the current flowing in the series resonant circuit. This is done to ensure that the resonant current flow is essentially at a zero level before turning on one power switch before turning the other off. The voltage representative of the resonant current $I_R$ is applied to a dual voltage comparator 170. The voltage is supplied to the inverting input of one operational amplifier 172 and to the noninverting input of a second operational amplifier 174. These amplifiers have their outputs ORed together by a direct connection. So long as the output voltage representative of the resonant current $I_R$ is at a zero level, the output voltage $V_6$ is high. However, if current is flowing in the resonant circuit as either a positive sinusoidal pulse or a negative sinusoidal pulse, the output voltage $V_6$ will go low. A smally hysteresis effect takes place such that upon turn on of resonant current, approximately 10% of the peak value of a current pulse will be required before $V_6$ goes low and, on turn off, approximately 2% of the peak value is required before $V_6$ goes high. These are within acceptable levels for minimal current flow in the power switches without causing damage. But for the slight hysteresis, it may be assumed that at the zero current $V_6$ is high and when current flows $V_6$ is low.

During start up of the power converter because of loading, AND gate 134 will clock flip-flop 140. One of the power transistors will be turned on providing the output voltage $V_5$ of gate 160 is high. This occurs because when the output voltage $V_3$ of the AND gate goes high to clock flip-flop 140, it also clocks the one-shot 150 so that after a short propagation time its output voltage $V_4$ goes low. The output voltage $V_4$ is supplied to one input of the gate 160 causing its output $V_5$ to go high. This is passed by one of the AND gates 142 and 144 to turn on one of the power switches 52 and 54. Current will now flow in the series resonant circuit. In the absence of any change now taking place at the unregulated source or at the load, this current will be a sinusoidal pulse of a duration determined by the resonant circuit.

Comparator 170 now monitors the resonant current flow. If current is flowing in the resonant circuit, then output voltage $V_6$ goes low (see FIG. 5F). When the voltage $V_6$ goes low, it supplies a second low input to gate 160 to maintain its output voltage $V_5$ high to keep the power switch turned on. As the voltage $V_6$ goes low, it also resets the one-shot 150 so that its output voltage $V_4$ returns to its normally high voltage level. However, so long as comparator 170 detects that current is flowing in the resonant circuit, it will maintain output voltage $V_6$ high. Voltage $V_5$ will remain high to keep the power switch on. Once the current flow is zero, the output voltage $V_6$ of the comparator will return to its normal high level. This causes voltage $V_5$ to go low and turn off the power switch. The other power switch can now be turned on when AND gate 134 next clocks flip-flop 140 and one-shot circuit 150.

In the example herein, a circuit was tested employing sinusoidal pulses having a normal pulse width of 2.5 microseconds. During stable source and load conditions, this circuit was able to run during full power conditions at a frequency that closely approached the maximum resonant frequency. During such operation, the dead time was on the order of 0.03 microseconds between current pulses. This was sufficient time to turn off one power switch and turn on the other. Power conversion was efficient as power was transferred for 5.0 microseconds over a 5.6 microsecond operating cycle. Thus, power is transferred for 89% of the operating cycle.

Figure 3:
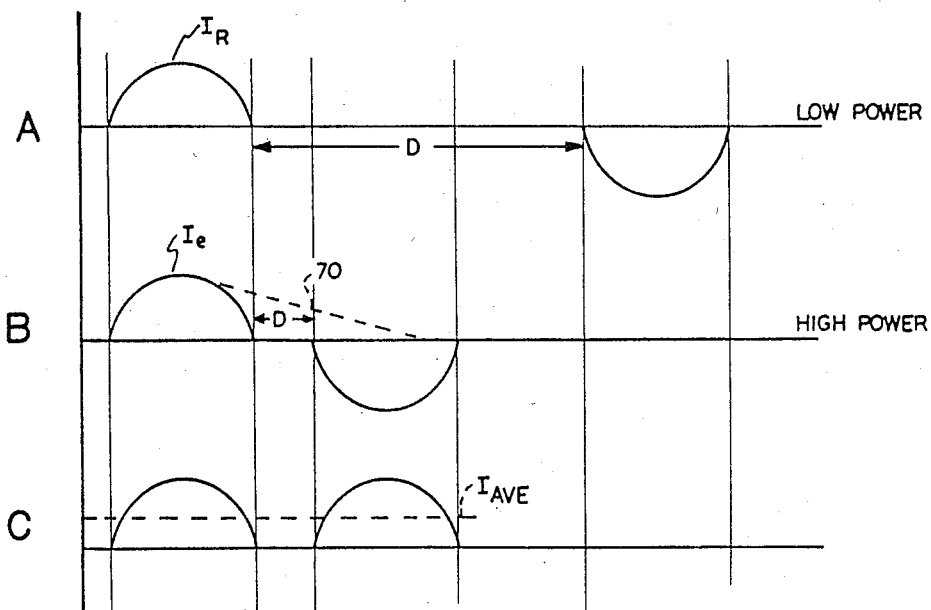
FIGS. 3A-3C are waveforms of current pulses flowing in the resonant circuit.
Figure 5:
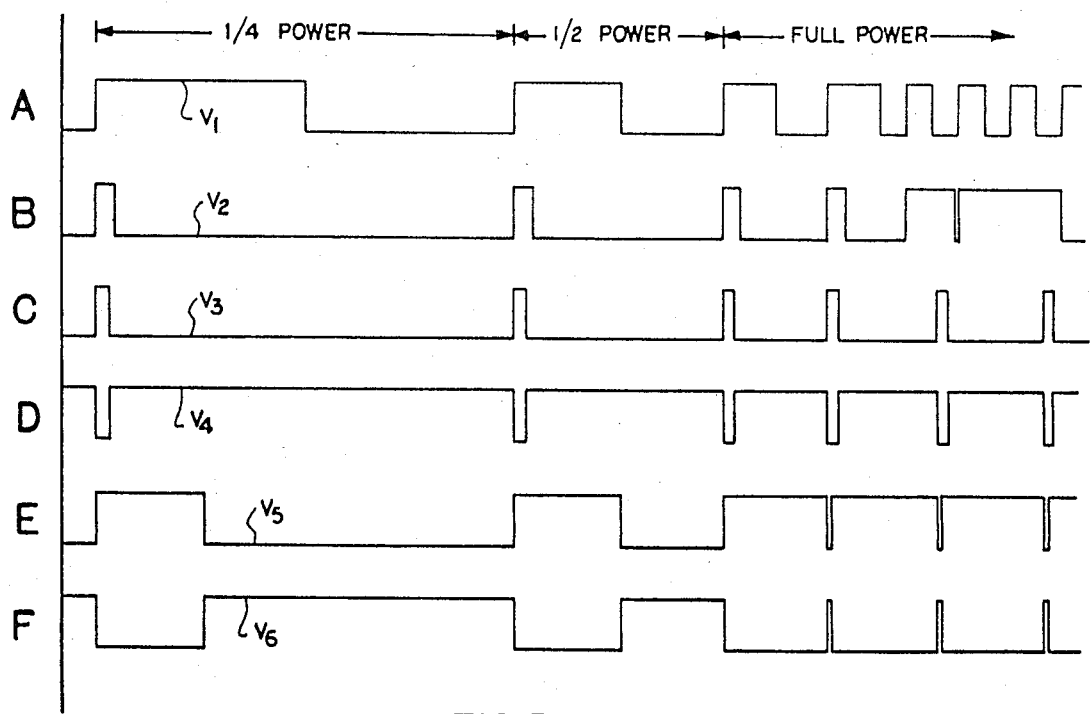

Having described the control 28 for the series resonant converter with reference to FIGS. 3, 4 and 5, attention is now redirected to FIGS. 1 and 2. As shown in FIG. 1, the low power series resonant converter 20' operates in parallel with the higher power converter 20. At full power, when both converters are operating close to the maximum resonant frequency, on the order of 200 KHz, the high power converter contributes power on the order of 1500 watts, whereas the low power converter 20' contributes power on the order of 150 watts. The difference comes about mainly because of the choice of lower valued power components for converter 20° than for converter 20. These power components, with reference to FIG. 2 and converter 20, are mainly the lumped reactance L as seen on the primary side of transformer 22 and capacitors $C_1$ and $C_2$. In the high power converter 20, capacitors $C_1$ and $C_2$ each have a value on the order of 0.2 microfarads and the inductor L has a value on the order of 4 microhenries. Converter 20' is structured the same as that of converter 20 illustrated in FIG. 2, but its lumped reactance L' (which compares with inductor L in FIG. 2) has a value which is a multiple of ten times the inductor L (i.e., on the order of 40 microhenries). Each of the capacitors in converter 20' which compare with capacitors $C_1$ and $C_2$ has a value on the order of 1/10 of those capacitors (i.e., on the order of 0.02 microfarads). At a frequency approaching maximum resonant frequency $F_M$, on the order of 200 KHz for each converter, the maximum power transfer will be on the order of 1500 watts for converter 20 and 150 watts for converter 20'.

In accordance with the present invention, it is contemplated that both converters 20 and 20' operate in parallel during high power (high loading) conditions to contribute to the total transfer of power to the output. Situations may develop, such as for short periods of time, during which the loading subsides to a low level and the operating frequency drops considerably below 200 KHz into that of the telephone voice band, namely within a frequency range on the order of 300 Hz to 3400 Hz. It is contemplated that one application of the power supply 10 is for providing power to telephone lines. If the converters operate in this frequency range, objectionable audible noise will be injected onto the telphone lines. This is because a ripple voltage takes place across capacitor 98 and feeds the output. This ripple voltage may have an amplitude on the order of 30 millivolts which is attenuated (not audible to the listener) below 300 Hz and above 3400 Hz. However, within this telephone voice band there is little attenuation. Essentially no attenuation occurs at 1000 Hz. At low power requirements, such as under 150 watts, the operating frequency of the converters may be so low as to be in this range. The ripple voltage may inject audible noise onto the telephone lines. For such low loading, under 150 watts, operation outside of this frequency band may be accomplished by disabling converter 20 and permitting only converter 20' to operate.

In accordance with the present invention, the converter control 200 monitors the operating frequency of the converters 20 and 20' and whenever the loading drops such that the operating frequency drops into the voice frequency band, driver circuit 30 is disabled, thereby disabling the series resonant converter 20. As the low power requirements approach 150 watts, converter 20' will operate at a frequency close to that of its maximum resonant frequency, on the order of 200 KHz. In this case, converter 20' will be operating outside of the voice frequency band providing power transfer without objectionable audible noise being injected onto the telephone line. Converter control 200 now monitors the operating frequency of the low power converter 20'. When the loading requirements cause its operating frequency to reach its maximum operating frequency of 200 KHz, control 200 will again enable driver 30 to permit operation of converter 20. Since both converters are now operating to supply power, their operating frequency will fall substantially below the maximum resonant frequency and increase again in accordance with the loading requirements. The converter control 200 will now revert to monitoring the operating frequency of the two converters operating in parallel for the purposes of once again disabling driver 30 if the loading becomes so low that the operating frequency again attempts to enter the telephone voice band.

Having briefly described the operation of the converter control with reference to FIG. 1, attention is now directed to the following description first with reference to FIG. 2 and then with reference to FIG. 4 for a more detailed description of the operation.

The resonant current $I_R$ flowing in converter 20' is sensed in the same fashion as that discussed hereinbefore with reference to converter 20. In FIG. 2, the resonant current for converter 20 was sensed with the use of a current transformer 72 having a single turn primary 74 connected in the series resonant circuit. The secondary winding 74 is connected to a wave shaping circuit to develop an output potential representative of the magnitude of the resonant current. For converter 20', the resonant current is also measured with the use of a single turn primary winding 74' connected to the resonant circuit in converter 20' in the same manner as that of winding 74 in FIG. 2. Winding 74' is wound on the same transformer 72 as that of winding 74 and they share a common secondary winding 76 which feeds the wave shaping circuit. Consequently, the resonant current $I_R$ that is supplied to the control 28 is a composite measure of the resonant current flowing in both of the converters 20 and 20'.

The average current in converter 20' is measured in the same manner as that of the average current in converter 20 which employs a current transformer 102 having a single turn primary 103 connected in the series resonant circuit. In a manner similar to that of measuring resonant current, converter 20' has a single turn primary winding 103' connected in its series resonant circuit. This primary winding 103' is wound on the same transformer 102 as that of winding 103 in converter 20.

A common seondary winding is provided which feeds a wave shaping circuit to provide an output voltage representative of the average current $I_{ave}$ which is then supplied to the control 30. The output of the series resonant converter 20' is recitified with secondary recitification in the same manner as that shown for converter 20 in FIG. 2 with the rectified output being connected across capacitor 98 and the load. The output voltage $V_0$, then, represents the composite output voltage for both converters. This output voltage $V_0$ is supplied to the control 30 along with the voltages representative of the average current and the resonant current for controlling the power converters.

Reference is now made to FIGS. 1, 2 and 4. For low power requirements, such as 150 watts or less, only converter 20' is operating and converter 20 is disabled. In FIG. 4 a D-type flip-flop 202 in the converter control 200, supplies from its Q output a binary 0 level signal to AND gates 142 and 144 in the driver 30, during low power operations. This disables driver 30 so that for low power requirements (low loading) flip-flop 140 alternately enables only AND gates 242 and 244 in driver 30'. Depending upon which of these AND gates 242 and 244 is enabled by flip-flop 140, one will then pass the drive enable voltage $V_5$ by way of one of the buffer amplifiers 246 and 248 to turn on one of the power switches, corresponding with power switches 52 and 54, in the converter 20'. The operation of transferring power to the load will now take place in the manner as described in detail hereinbefore.

As the loading requirements call for increased power, the frequency of the positive going pulses of voltage $V_1$ from converter 130 will increase. The frequency of voltage $V_1$ is twice that of the operating frequency. When this frequency attains a level approaching 400 KHz it indicates the converter is approaching the maximum resonant frequency $F_M$. For converter 20' this is on the order of 200 KHz. The converter 20' will be providing essentially its maximum power output, on the order of 150 watts. Since the load requirements demand additional power, the converter control 200 now operates to also turn on the high power converter 20 for operation up to an additional 1500 watts. The converter control 200 includes, for this purpose, a phase lock loop circuit 204. This preferably takes the form of an integrated circuit chip type 4046, available as from RCA. Functionally, for the mode of operation contemplated herein, this chip may take the form as illustrated within the dotted lines of circuit 204 in FIG. 4. This circuit includes a frequency comparator 206 which compares the frequency of voltage $V_1$ with a reference frequency $F_R$ provided by a voltage-to-frequency converter 207.

It is contemplated that the reference frequency $F_R$ will have two different frequency values depending upon the mode of operation in effect. During low power operations when only converter 20' is operating, the reference frequency $F_R$ will be set at 400 KHz (twice the maximum resonant frequency), which results in the maximum operating frequency, 200 KHz, for the low power converter. When the loading requirements are such that more power is desired, then as the frequency of voltage $V_1$ attempts to exceed 400 KHz, the frequency comparator 206 will provide a binary 1 output signal which is supplied to the D input of flip-flop 202. The next time the output voltage $V_3$ of AND gate 134 goes positive, the Q output of flip-flop 202 will go positive to enable AND gates 142 and 144 in driver 30 so that converter 20 is turned on to operate in parallel with converter 20'. Both converters are now operating and the operating frequency will drop considerably below the maximum resonant frequency of 200 KHz and then build up in accordance with loading requirements.

With both converters operating, situations may take place in which there is a drop in the loading. In this event, the operating frequency of the two converters may drop to a low level frequency such as that below 3000 Hz and then be within the telephone voice band of from approximately 300 Hz to 3400 Hz. As discussed hereinbefore, such operations may cause objectionable noise on the telephone lines and should be avoided by switching to a low power source so as to reduce the peak-to-peak ripple voltage level. Consequently, then, during high power operations, when both converters are operating, the reference frequency $F_R$ is set at a magnitude of 6000 Hz (this represents an operating frequency of 3000 Hz). In such case, when the frequency of voltage $V_1$, drops below 6000 Hz the frequency comparator 206 will provide a binary 0 at its output and this is supplied to the D input of flip-flop 202. The next time that the output voltage $V_3$ of AND gate 134 goes positive, it will clock flip-flop 202 so that its Q output supplies a binary 0 signal to disable AND gates 142 and 144 in the drive 30. This, then, turns off the high power converter 20 and only converter 20' operates. This will substantially reduce the peak-to-peak value of the ripple voltage to reduce the objectionable noise. Additionally, converter 20' will operate at a substantially different frequency, since it must approach an operating frequency close to that of the maximum resonant frequency of 200 KHz in order to provide 150 watts of power.

As discussed above, during low power operations when only converter 20' is operating, the reference frequency $F_R$ is set at 400 KHz so that when the frequency of voltage $V_1$ attempts to exceed this level, converter 20 will be turned on. Until this threshold is attained, the output of the frequency comparator 206 and flip-flop 202 is at a binary 0 level. This binary 0 signal from flip-flop 202 is fed back and inverted by an inverter 210 to enable an AND gate 212. Once AND gate 212 is enabled during the start up or lower power operation, it will pass a high voltage $V_{hi}$ which presents a high level voltage to the voltage-to-frequency converter representative of a frequency of 400 KHz. This voltage-to-frequency converter is a linear converter in that its output frequency is proportional to its input voltage as opposed to the inverse function performed by the voltage-to-frequency converter 130 discussed hereinabove.

During high power operation, both of the converters 20 and 20' are operating and the frequency comparator 206 is monitoring to determine whether the frequency of voltage $V_1$ drops below the reference frequency set at 6000 Hz. During this mode of operation, the output of the flip-flop 202 is at a binary 1 level which is used to enable the second AND gate 214 and disable AND gate 212 by way of inverter 210. With AND gate 214 being enabled, it passes a low voltage $V_{lo}$ as the low voltage input to the voltage-to-frequency converter 207. This low voltage is set at a value representative of 6000 Hz so as to obtain the correct reference frequency $F_R$.

As will be recalled from the description above, the output voltage $V_3$ of AND gate 134 goes high only when all of the inputs to the AND gate are high. Since the output voltage $V_6$ of the voltage comparator is high only when no current is flowing in the resonant circuits of converters 20 and 20', it is only during this condition that output voltage $V_3$ can clock flip-flop 202 to cause a change in state to either turn on or turn off converter 20, as the case requires.

In summation, the power supply 10 incorporates a high power series resonant converter 20 and a low power series resonant converter 20'. Both converters operate by supplying sinusoidal pulses in alternate directions through a resonant tank circuit with the frequency of supplying pulses increasing with load requirements. Both converters are employed and operate in parallel to supply power to a load during high power applications. However, when loading changes such that the operating frequency falls to a low level, the converter control 200 operates to turn off the high power converter 20, leaving only the lower power converter 20' in operation. This lowers the peak-to-peak ripple voltage applied to the load as well as changing the operating frequency of the low power converter and thereby avoids injecting noise into the load. If such a power supply is employed for use with telephone networks, then the switching of the converters at low frequency avoids injecting noise during operations within the telephone voice band, in the range of approximately 300 Hz to 3400 Hz.

Although the invention has been described in conjunction with a preferred embodiment, it is to be appreciated that various modifications may be made without departing from the spirit and scope of the invention as defined by the appended claims.

Having described a specific preferred embodiment of the invention, the following is claimed:

1. A power supply for supplying regulated power to an output circuit from an unregulated DC voltage source, comprising:
   low and high power series resonant converters interposed between a said source and an output circuit, each of said converters including a pair of power switch means adapted to be alternately turned on and off for each completing, when on, a series resonant circuit with a primary winding of a transformer coupled to said output circuit so that current pulses alternately flow in opposing directions through said primary winding as said switch means are turned on and off, said low power converter having its resonant circuit composed of lower valued power components than that of said high power converter;
   switch control means for alternately supplying a switch on signal for turning on only one of said switch means in each of said converters and then a switch on signal for turning on only the other of said switch means in each of said converters at an operating frequency which varies with the loading of said output circuit; and
   converter control means responsive to said operating frequency for disabling said high power converter switch means when the operating frequency of both said converters falls below a predetermined frequency whereupon only said low power converter operates to supply power to the output circuit.

2. A power supply as set forth in claim 1 wherein said converter control means includes switch disable means for providing a desirable signal for disabling said high power converter switch means when the operating frequency of both converters falls below said predetermined value.

3. A power supply as set forth in claim 2 wherein said switch control means includes switch driver means for normally passing said switch on signals to the switch means in said high power converter and being responsive to said disable signal for blocking the passage of said switch on signals to thereby disable said high power converter.

4. A power supply as set forth in claim 3 wherein said converter control means includes frequency comparison means for comparing a first frequency signal, having a frequency representative of the operating frequency, with a reference frequency for providing a said first signal when the frequency of the former is less than that of the latter and a second signal when the frequency of the former is greater than that of the latter.

5. A power supply as set forth in claim 4, wherein said switch disable means is coupled to said frequency conversion means and responsive to a said first signal for providing a said disable signal and responsive to a said second signal for terminating a said disable signal.

6. A power supply as set forth in claim 5, including means for providing a low frequency signal as said frequency reference signal when both said lower power and high power converters are operating and a high frequency signal as said reference signal when only said low power converter is operating so that when the operating frequency of said low power converter exceeds the frequency of said high frequency reference signal the said disable signal is removed permitting operation of both said converters.

7. A power supply as set forth in claim 6, wherein said control means includes resonant current detection means for providing a control signal having a value representative of whether current is flowing in said resonant circuit.

8. A power supply as set forth in claim 7, wherein said switch disable means is also responsive to said control signal such that it will only provide or terminate a said disable signal when said control signal has a value representative that no current is flowing in said resonant circuit.

* * * * *